Sept. 18, 1962 L. C. EBEL 3,054,382
APPARATUS FOR IMPREGNATING CABLES
Filed Jan. 12, 1960 2 Sheets-Sheet 1

INVENTOR
LAWRENCE C. EBEL
BY Pennie, Edmonds,
Morton, Barrows and Taylor.
ATTORNEYS Sept. 18, 1962 L. C. EBEL 3,054,382
APPARATUS FOR IMPREGNATING CABLES
Filed Jan. 12, 1960 2 Sheets-Sheet 2

INVENTOR
LAWRENCE C. EBEL
BY Pennie, Edmonds
Morton, Barrows & Taylor.
ATTORNEYS

United States Patent Office 3,054,382
Patented Sept. 18, 1962

3,054,382
APPARATUS FOR IMPREGNATING CABLES
Lawrence C. Ebel, Hastings-on-Hudson, N.Y., assignor to Anaconda Wire and Cable Company, a corporation of Delaware
Filed Jan. 12, 1960, Ser. No. 1,985
10 Claims. (Cl. 118—423)

This invention relates to apparatus for impregnating porous coverings on electrical conductors or the like, such as electric cables, and more particularly, to a tank in which a reel of cable may be immersed in a suitable fluid, and from which the cable can be withdrawn, after the porous covering has been impregnated, as the reel rotates within the tank.

High-voltage electric power cable, having one or more conductors, is often manufactured with an oil-impregnated layer of paper or other porous insulating material surrounding the conductor and with a lead sheath extruded over the impregnated layer. The purpose of the oil impregnant is to fill completely all voids and interstices in the porous insulating material around the conductor, thereby substantially reducing electrical stress concentrations which cause deterioration of the insulation. The lead sheath covering the impregnated layer prevents leakage and evaporation of the oil, and provides an electric shield and mechanical sheath for the conductor. It is highly important, therefore, that during the manufacture of such cable the lead sheath be applied quickly after the porous layer is impregnated before an appreciable amount of oil drains from the layer. Otherwise harmful voids will exist within the finished cable. Also, since the dielectric properties of the impregnating oil are impaired when the oil is exposed to air, the impregnated conductor should not be exposed to the atmosphere for any appreciable time before the lead sheath is applied.

Various closed-system methods are now employed for impregnating an entire reel of paper-covered conductor without exposing the impregnating oil to the atmosphere either during the conditioning of the oil or during the impregnation of the cable. In such methods one or more reels of the paper-covered conductor are usually placed in a sealed tank and heated to drive off moisture from the insulation. The oil impregnant is also heated and is introduced under vacuum to remove the air as the tank is being filled and the reel immerse. Pressure is then applied to the oil to completely impregnate the porous insulation, and the oil bath is then carefully cooled. After the oil is drained from the tank, the reels are removed and conveyed to a lead extrusion press where they are rotatably mounted so that the impregnated insulated conductor can be unwound into the press.

If in these methods the reels of impregnated insulated conductor are not transferred immediately to the lead extrusion press, viz., before the oil drains from the insulation or is excessively exposed to air, the quality of the finished product will be adversely affected regardless of how effectively impregnation is carried out in the tank. Thus, as a major improvement over the impregnating techniques now in use, it is an object of the present invention to withdraw the impregnated conductor directly from the tank into the lead press without removing the immersed reel from the oil bath in the tank. The harmful effects of drainage of the oil from the insulation and of exposure of the oil to air are thereby avoided and the dielectric properties of the finished cable are improved correspondingly.

The apparatus in accordance with the invention includes a tank adapted to contain a reel of paper-covered electrical conductor and a dielectric fluid such as oil, and a removable end cover substantially closing the tank. Supporting means within the tank support the reel so as to be immersed in the fluid and to permit substantially free rotation of the reel. The tank has an upper egress opening through which the cable can be withdrawn from the reel after impregnation, and closure means to seal off the opening during the impregnating process. An important improvement is introduced by the guiding means located within the tank for guiding the paper-covered electrical conductor in a smooth, spiral path from the reel to the egress opening.

In this apparatus, the reel rotates within the tank as the cable is withdrawn, and is both supported and guided to the fixed egress opening. Thus this egress opening in the tank through which the impregnated insulated conductor emerges need be only large enough to accommodate the covered conductor, because the covered conductor enters and passes through the opening substantially in line therewith. The bulky funnel-like device heretofore needed to guide the cable into the opening is no longer required; and the usual large exit window, which greatly weakens the tank, can be eliminated. It should also be noted that this small fixed egress opening in the tank can advantageously communicate directly with the inlet of a lead extrusion press located adjacent the impregnating tank so that the lead sheath is applied immediately after the impregnation, as an uninterrupted process. An additional advantage of the invention resides in the fact that the interior of the tank need be only slightly larger than the reels to be accommodated, with a resulting saving in impregnating fluid.

Two embodiments of the impregnating apparatus in accordance with the invention are described below with reference to the accompanying drawings, wherein.

Figure 1:
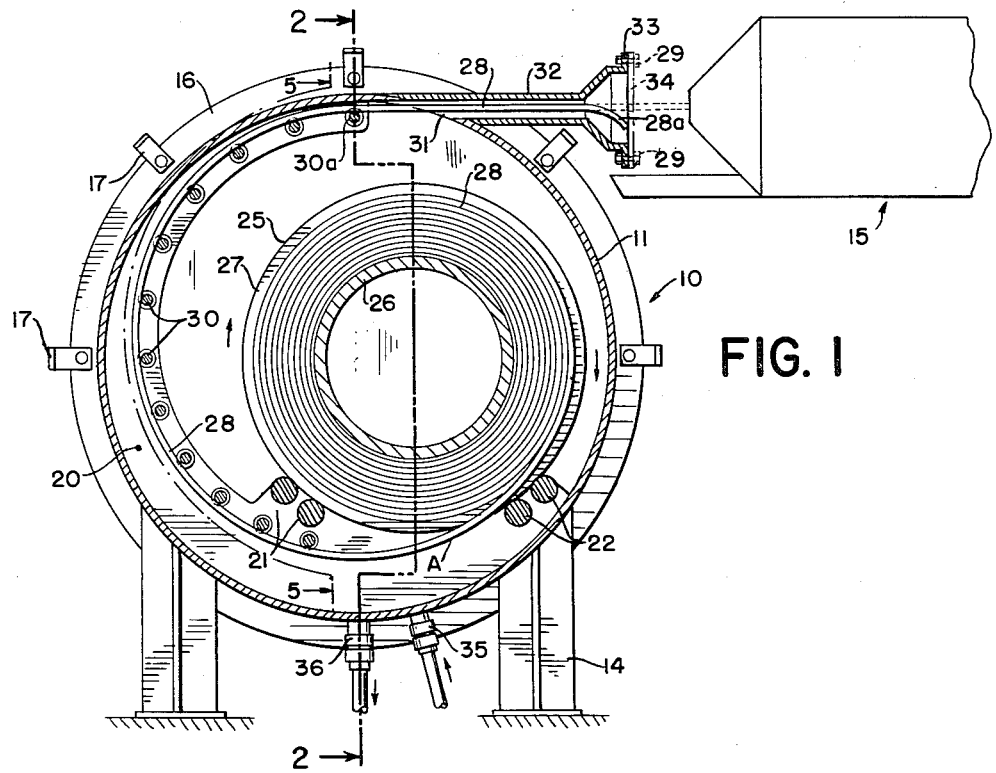
FIG. 1 is an elevational view, partly in cross-section, of the tank with the end cover removed showing the reel supported therein.
Figure 2:
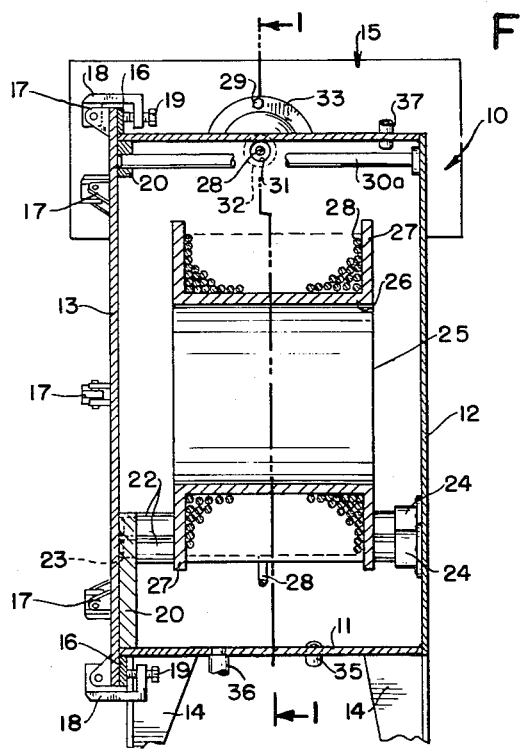
FIG. 2 is a view taken along the line 2—2 of FIG. 1.

FIGS. 1 and 2 illustrate an axially horizontal cylindrical tank 10 which comprises a cylindrical body portion 11 closed at one end by an affixed end wall 12 and at the other by a circular movable end cover 13. Legs 14 support the tank on the floor adjacent to a lead extrusion press, part of which is indicated schematically at 15. Around the open end of tank 10 (to the left as seen in FIG. 2) is attached a concentric circular flange 16 which provides a seat for the circular end cover 13. If needed, a sealing gasket can be interposed between the flange and cover. Several clamps 17 are affixed to the periphery of the cover 13, each having a C-frame member 18 pivotally mounted on a bracket attached to the outer surface of the end cover 13. These C-frames are adapted to be swung over the flange 16, as shown in FIG. 2, so that screws 19 on the movable ends of the clamp may be turned down to draw the end cover 13 against the flange. When the end cover 13 is applied in this manner the open end of the tank 10 is hermetically sealed in respect to internal vacuum as well as high pressure.

As seen in FIG. 1, an arcuate bearing plate 20 is affixed to the inner cylindrical surface of the body portion 11 immediately inside the open end of the tank. Two pairs of relatively heavy supporting rollers 21, 22 are rotatably mounted at one end by inner journal bearings 23 in bearing plate 20, and by outer journal bearings 24 attached to the inside surface of the end wall 12. These supporting rollers 21 and 22 underlie and support a cable reel 25, holding an electrical conductor, here assumed to be covered with paper. Rollers 21, 22 may be fitted with remotely operated brakes (not illustrated), either within or outside the tank, to control the rotation of the reel, especially to prevent over-running as the inside end of the cable is unreeled.

This reel, which is of conventional design, is supported with its axis parallel to the axis of the cylindrical tank 10, and its comprises a cylindrical portion 26 and two concentric circular end flanges 27 between which the cable 28 is wound. The edges of the circular flanges 27 rest, a shown, upon the supporting rollers 21 and 22. As seen in FIG. 1, the bearings 23 supporting the ends of the supporting rollers 21 and 22 are located so that the peripheries of the rollers are flush with the edge of the bearing plate 20. This eliminates a possible obstruction which might interfere with moving the reel in and out of the tank. Any of several means employed in the art for handling reels of various weights and dimensions may be used for this purpose. Although two pairs of rollers are shown, two rollers may be sufficient to support light reels provided they are spaced apart less than the diameter of the flanges 27.

In addition to the supporting rollers, several parallel, horizontal cable-guiding rollers 30 are also mounted around one side of the tank in suitable journal bearings on the bearing plate 20 and on the end wall 12 respectively. These guiding rollers 30 define a narrow space around the inner surface of the cylindrical body portion 11, through which the cable is spirally lead from a point A between the pairs of supporting rollers at the bottom of the tank around one side thereof, and up to an egress port 31 at the top of the tank. In order to lead the cable smoothly into port 31, the last roller 30a may advantageously be centrally grooved to accommodate the periphery of the cable and center it in the opening. Similary, some of the rollers adjacent to roller 30a, or all of them, may be provided with progressively wider grooves. If there is any tendency for the cable to leave the groove, another grooved roller may be placed over the cable.

At port 31 a duct member 32 is tangentially attached to the cylindrical body portion 11 and thus communicates with the interior of the tank. This duct 32 extends as close as possible to the inlet end of the lead extrusion press 15 adjoining the impregnating apparatus. If desired, the two may be attached by a closed conduit so that the cable is enclosed from the tank to the press, as previously mentioned.

The outer end of duct 32 is flared and bears a flange 33 which provides a seat for a removable sealing plate 34. Several bolts 29 spaced around the periphery of the flange 33 permit the sealing plate 34 to be tightly seated on the outer surface of flange 33. When end cover 13 and sealing plate 34 are in place, tank 10 is completely closed and sealed.

In practice, several other auxiliary devices would also be associated with an impregnating tank of this type (such as cooling coils, vacuum exhaust conduits, heating means, etc.), but for purposes of illustration they are omitted in the drawings since they form no part of the invention. However, at the bottom of the tank are shown an inlet connection 35 through which cable insulating oil may be deliverd from suitable conditioning apparatus, and an outlet connection 36 through which the oil may be drained from the tank after the impregnation and before the reel is removed. Pipe coupling 37 at the top of the tank is for connection to a vacuum line.

In the operation of the impregnating apparatus here illustrated, the end cover 13 is first removed from tank 10 so that the reel 25 of paper-covered (or the equivalent) electrical conductor 28 may be placed within the tank on the pairs of supporting rollers 21 and 22. The reel 25 is positioned so that the end of the conductor depends from the right side of the reel looking toward the open end of the tank (as in FIG. 1). This end of the conductor is then drawn between the pairs of supporting rollers 21 and 22 and directed outside the guiding rollers 30, up and around to the right, as seen in FIG. 1, and through the port 31 into the duct member 32. With the direction of winding as illustrated, the reel 25 will be rotated clockwise on the supporting rollers 21 and 22 as the cable is drawn off. The end 28a of the paper-covered conductor 28 is carried directly up to the position of the inside of the sealing plate 34 as shown in FIG. 1, although at that time the sealing plate is off. The sealing plate 34 is then secured in place to seal the duct 32.

Next, the end cover 13 is secured against flange 16 by the clamps 17, and the reel of paper-covered conductor is thus sealed within the tank. Usually heat and vacuum are applied to remove all moisture from the paper-covered conductor while the cable oil is heated and conditioned in usual manner in separate apparatus. The oil is then drawn into the tank under vacuum through the inlet connection 35 and rises in the tank to immerse the reel completely. Impregnation of the paper covering on the conductor commences at this time and is continued while pressure is applied to the interior of the tank for a sufficient period.

To proceed with the subsequent lead-sheathing operation the oil is cooled, and the sealing plate 34 is removed by loosening the bolts 29. The loose end 28a of the conductor, which extends into the flared portion of the duct 32, is grasped and the conductor is drawn into the inlet end of the lead extrusion press 15, represented in FIG. 1. Extrusion of the lead sheath is then commenced about the paper-covered conductor as the cable is drawn slowly through the press, its place in the tank being filled with additional oil. As the cable pays out from the tank, the feed-off point A at which the cable departs from its lay on the reel 25 moves back and forth along a line parallel to the axis of the reel. Because of the fact that the reel with its cable is constantly supported by its flanges 27 on rollers 21, 22, this point A changes its position radially only a small distance depending on the difference in radius between the top and bottom layers of the reel. At either extreme end, and, of course, between the two ends, the guide rollers 30 lead the cable smoothly along a spiral path into the center of duct 32, which, as mentioned, need be, and advantageously is, only large enough to pass the cable. For this reason the cable guiding and supporting means at the bottom is shown as wide as the reel, and at the top as wide as the port 31. Thus, very little bending occurs in the impregnated conductor as it spirals smoothly from the reel and enters the port 31 substantially in the center thereof. Moreover, since the cable is drawn from the reel in a downward direction between the pairs of supporting rollers 21 and 22, the tension on the conductor and its covering 28 does not tend to lift the reel 25, and the stress on the cable is therefore considerably less than it would be if the cable were drawn upwardly from the reel.

When the inner end of the conductor 28 finally slips from the reel 25 near the end of the lead-sheathing operation, the reel stops rotating, usually by applying the mentioned brakes, and the conductor is drawn entirely from the tank. At this time (and not until then) the outlet connection 36 is opened, the tank is drained, the end cover 13 is removed and the empty reel is taken from the tank. If a new reel of insulated conductor is to be impregnated, it is placed on the supporting rollers 21, 22 as before, and the above-described steps repeated.

Figure 3:
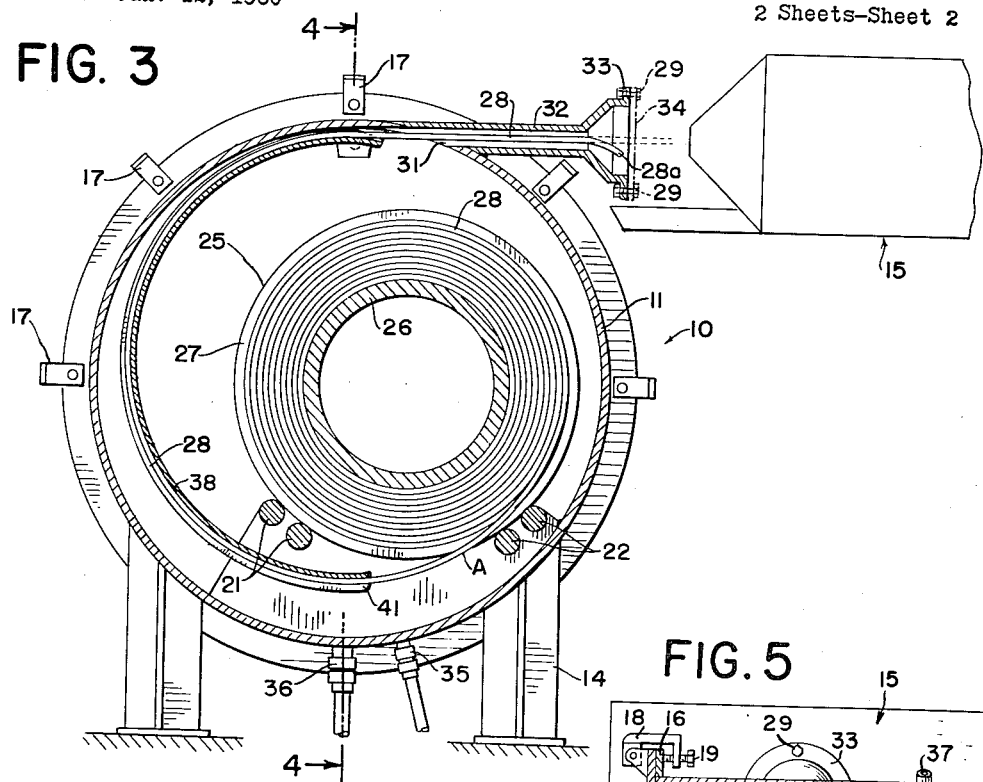
FIG. 3 is an elevational view, partly in cross-section, of an alternative embodiment of the invention in which the cable, in passing from the reel to the egress opening is guided and supported by a trough-like structure.
Figure 4:
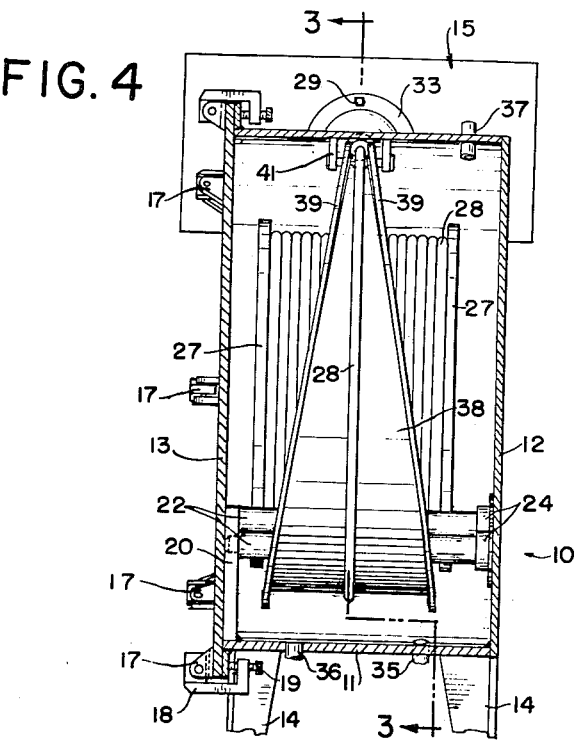
FIG. 4 is a view taken along line 4—4 of FIG. 3.
Figure 5:
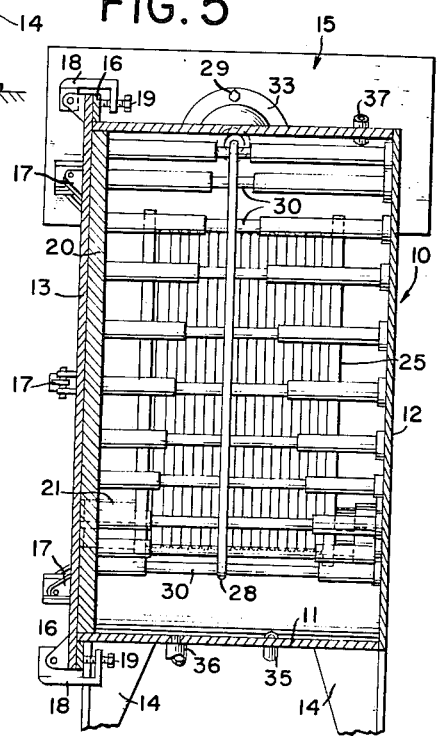
FIG. 5 is a view taken substantially along the line 5—5 of FIG. 1.

FIGS. 3 and 4 illustrate an alternative embodiment of the invention which for some purposes is to be preferred. In these figures reference characters which also appear in FIGS. 1 and 2 represent corresponding elements. The principal difference resides in the means for supporting and guiding the cable from the feed-off point A at which it leaves the reel, to the port 31. This alternative form is simpler than the one first described because a trough-like tray 38 is substituted for the guiding rollers. This tray which should be of steel sufficiently thick to support the cable in the manner used, is curved to follow a path as smooth as possible between the top layer of the cable on the reel and the port 31 at the top of the tank. A tray 38 having such a curve is shown in FIGS. 3 and 4.

This tray is much more narrow at the top than at the bottom. At the top, the width of the tray between its flanges 39 is substantially the same as the width of the duct 31. At the bottom, the flanges 39 are separated by a distance approximately the same as the spacing between the flanges 27 of the reel. Thus, the taper between the flanges 39 corresponds to the taper represented by the progressively smaller grooves in the rollers of FIG. 1 from the bottom-most roller 30 to the topmost roller 30a. The purpose is the same in both instances, namely, to permit the cable to move transversely as the feed-off point A moves horizontally back and forth across successive layers of cable on the reel, but to permit no sidewise motion where it leaves the top of the tray.

As seen more clearly in FIG. 4, the tray 38 is supported on a strong hinge 41 which permits it to swing in a vertical plane over a distance limited by stops (not shown). Thus, the bottom edge 41 (FIG. 3) of the tray can move progressively closer to the axis of the reel as the diameter of the cable on the reel decreases when the cable is being unwound. The path of the cable between the feed-off point A and the edge 41 of the tray remains substantially smooth, avoiding sharp bends as well as excessive wear on the tray near edge 41 thereof.

The impregnating oil in the tank provides lubrication between the cable 28 and its supporting means, viz, rollers 30 and trough 38, as the cable is drawn over it. As the cable unwinds from the reel, the feed-off point A will tend to move inwardly of the reel and therefore vertically in the tank. This increases the vertical pull upwardly on the trough 38, tending to swing the end of the trough closer to the center of the reel. Thus, over a limited distance, the trough tends to adjust itself, minimizing the tendency toward bending the cable. Although it is possible to construct the tray of substantially uniform width, or at least so that it is not as wide as the layers of cable on the reel, this requires that the tray itself be articulated or hinged such that the bottom of the tray can also swing in a generally horizontal plane to follow the cable as adjacent turns unwind. Since such construction is more complicated than the one illustrated, it is not preferred and is not shown.

From the foregoing description, it is clear that the insulated conductor is not unduly exposed to the atmosphere at any time after impregnation because the lead sheathing is applied quickly before an appreciable amount of oil can drain from the paper covering. The oil drips from the cable and reel only within the tank, and this is both a convenience and an economy. Since the apparatus is of a simple, compact design, it may be located adjacent the lead extrusion press with the duct member 32 communicating directly into the inlet of the press to permit the continuous withdrawal of the impregnated cable into the press. The reel therefore remains in the tank as the lead sheath is applied, making it no longer necessary to handle the impregnated reel between the impregnating and sheathing operations.

I claim:

1. Apparatus for impregnating with a fluid a length of cable comprising an electric conductor covered with a porous insulating layer and wound on a reel, said apparatus comprising a tank adapted to contain said reel and fluid, said tank having an opening therein adapted to pass a reel, a removable cover adapted to close said opening, reel-supporting means within said tank adapted to support said reel with the reel axis substantially horizontal, said supporting means being arranged and disposed to permit substantially free rotation with respect to the axis of the reel, said tank having a closable egress port near the top thereof through which the covered electric conductor can be withdrawn, as it unwinds from the reel, and cable-guiding means disposed within said tank in a substantially smooth curve from a point near the bottom of the reel to a point in line with said port, for guiding and supporting the covered electric conductor from said reel in a substantially continuous smooth path to said port.

2. Apparatus according to claim 1 in which said cable-guiding means comprises a plurality of guide rollers journaled in said tank along a substantially smooth curved path lying in a vertical plane between a point near the bottom of the reel and said egress port.

3. Apparatus according to claim 2, in which at least some of said guide rollers are grooved to accommodate the cable, the grooves in successive rollers being of progressively decreasing width in the direction of movement of the cable from the reel to the port.

4. Apparatus according to claim 1 in which the reel has circular flanges, said supporting means comprising at least two supporting rollers journaled parallel to each other in the lower portion of said tank, said supporting rollers being spaced apart less than the diameter of said flanges, being longer than the distance between said flanges and being so disposed as to support a reel by its flanges, said reel being thereby free to roll on said supporting rollers.

5. Apparatus according to claim 4 in which said guiding means comprises a plurality of guide rollers journaled in said tank along a substantially smooth curved path lying between a point between said supporting rollers and said egress port.

6. Apparatus according to claim 5 in which at least some of said guide rollers are grooved to accommodate the cable, the grooves in successive rollers being of progressively decreasing width in the direction of movement of said cable from said reel to said port.

7. Apparatus for impregnating with a dielectric fluid a length of paper-covered electric conductor wound on a reel, comprising an axially horizontal substantially cylindrical tank adapted to contain said reel and said fluid, an opening in an end of said tank adapted to pass said reel, a removable cover adapted to close said opening, supporting means adapted to support said reel horizontally within said tank, said supporting means being proportioned and disposed to permit substantially free rotation of said reel with respect to the axis of the reel, said cylindrical tank having a port near the top through which the covered electric conductor on the reel can be withdrawn, said opening being substantially only large enough to permit said paper-covered electric conductor to pass therethrough, closure means adapted to seal said port, horizontal guide rollers journaled within said tank along a substantially spiral curve from a point near the lower portion of the reel to the center of said port for guiding the paper-covered electric conductor in a smooth path from the lowest turn on said reel to said port, and fluid-filling and emptying means for said tank.

8. Apparatus according to claim 1 in which said cable-guiding means comprises a trough-like tray hinged at the top of the tank so as to swing in a substantially vertical plane, the bottom edge of the tray being substantially tangent to a circle concentric with the reel, the top edge of the tray being approximately in line with the bottom of said egress port, and the tray between said edges comprising a substantially smooth curve.

9. Apparatus according to claim 8 in which said tray at the bottom is approximately as wide as the turns of one layer of cable on the reel and at the top is approximately as wide as the egress port, tapering smoothly therebetween.

10. Apparatus for impregnating with a dielectric fluid a length of paper-covered electric conductor wound on a reel, comprising an axially horizontal substantially cylindrical tank adapted to contain said reel and said fluid, an opening in an end of said tank adapted to pass said reel, a removable cover adapted to close said opening, horizontal supporting rollers adapted to underlie said reel within said tank, said supporting rollers being proportioned and disposed to permit substantially free rotation and restricted translation of said reel with respect to the axis of the reel, said cylindrical tank having a port near the top through which the covered electric conductor on the reel can be withdrawn, said opening being substantially only large enough to permit said covered electric conductor to pass therethrough, closure means adapted to seal said port, means for supporting and guiding the covered electric conductor in a smooth path from the lower portion of said reel to said port, comprising a trough-like tray extending from near the bottom of the reel to said port, being wider at the bottom than at the top and being so supported as to move closer to the center of the reel as the conductor is unwound from the reel.

References Cited in the file of this patent

UNITED STATES PATENTS

| | | |
|---|---|---|
| 904,668 | Arents | Nov. 24, 1908 |
| 1,009,731 | Fisher | Nov. 28, 1911 |
| 1,157,694 | Hungerford | Oct. 26, 1915 |
| 1,183,615 | Wood | May 16, 1916 |
| 2,053,022 | Corswandt et al. | Sept. 1, 1936 |
| 2,629,768 | Beil | Feb. 24, 1953 |
| 2,692,737 | Rowe | Oct. 26, 1954 |

FOREIGN PATENTS

| | | |
|---|---|---|
| 545,018 | France | Oct. 4, 1922 |